US012253245B1

(12) United States Patent
Li

(10) Patent No.: US 12,253,245 B1
(45) Date of Patent: Mar. 18, 2025

(54) LIGHTING DEVICE WITH LOW MISPRESS BUTTONS

(71) Applicant: Wenjie Li, Guangzhou (CN)

(72) Inventor: Wenjie Li, Guangzhou (CN)

( * ) Notice: Subject to any disclaimer, the term of this patent is extended or adjusted under 35 U.S.C. 154(b) by 0 days.

(21) Appl. No.: 18/785,481

(22) Filed: Jul. 26, 2024

(30) Foreign Application Priority Data

May 23, 2024 (CN) ........................ 202410646339.2

(51) Int. Cl.
*F21V 23/04* (2006.01)

(52) U.S. Cl.
CPC ................................ *F21V 23/0421* (2013.01)

(58) Field of Classification Search
CPC ............. F21V 23/0414; F21V 23/0421; F21V 23/0428
See application file for complete search history.

(56) References Cited

U.S. PATENT DOCUMENTS

| | | | | |
|---|---|---|---|---|
| 10,928,051 | B1 * | 2/2021 | Worman | F21V 23/0414 |
| 11,181,258 | B2 * | 11/2021 | Worman | F21V 23/006 |
| 2003/0098405 | A1 | 5/2003 | Yamamoto et al. | |
| 2009/0080183 | A1 | 3/2009 | Opolka | |
| 2012/0176780 | A1 * | 7/2012 | Gross | F21L 4/027 362/184 |

* cited by examiner

*Primary Examiner* — Thomas M Sember
(74) *Attorney, Agent, or Firm* — Maier & Maier, PLLC

(57) ABSTRACT

A lighting device with low mispress buttons which includes a tail cover, a first button, a second button and a pressing plate. The pressing plate is rotatably connected to the tail cover and covering the second button to trigger and release the second button. The pressing plate is lower than the first button. The pressing plate includes a first inclined surface and a second inclined surface. The first inclined surface is arranged between the second inclined surface and the first button, and is connected to the second inclined surface. The second inclined surface is inclined downward relative to the first inclined surface. An end of the first inclined surface close to the second inclined surface is lower than an end of the first inclined surface close to the first button.

10 Claims, 6 Drawing Sheets

LIGHTING DEVICE WITH LOW MISPRESS BUTTONS

CROSS-REFERENCE TO RELATED APPLICATIONS

The present disclosure claims priority to Chinese Patent Application No. 202410646339.2, filed on May 23, 2024. The content of aforesaid application is incorporated herein by reference.

TECHNICAL FIELD

The present disclosure relates to the technical field of lighting devices, and in particular to a lighting device with low mispress buttons.

BACKGROUND

At present, lighting device such as flashlights have been widely used. Ordinary flashlights have only one switch at the tail end, which can only be used to turn the power on and off. In order to adapt to the changing application environment, flashlights with double switches at the tail end appear. The double-button design allows users to quickly operate the flashlight with one hand without changing the holding posture. For example, one button can be designated to turn the flashlight on and off, and the other button can be designated to switch from dimming to strobe mode or switch the lighting intensity level. This is very convenient for law enforcement officers or soldiers who use flashlights in dark environments, making the flashlight more flexible in tactical situations.

Generally, flashlights designed with double tail-button as switches always have the power on/off and dimming modes both designed at the tail end. However, the tail space of the flashlight is narrow, and the crowded end surface results in a small button contact area, making it difficult to press, which brings inconvenience to operation. In the prior art, a pressing plate is placed above the sub-button, and the sub-button is triggered and released by pressing the pressing plate. Since the surface area of the pressing plate is larger than that of the sub-button, the area of user's finger may contact is increased, thereby ensuring a easy trigger of the sub-button. However, when such button structure is adopted, it is very easy for the user to accidentally mispress the pressing plate when operating the main button, thereby causing the sub-button (the button triggered by the pressing plate) to be accidentally triggered.

Therefore, the existing technology still needs to be improved and developed.

SUMMARY

The purpose of the present disclosure is to provide a lighting device with low mispress buttons to reduce the probability of mispressing the buttons that are cooperated with the pressing plate.

The technical solution adopted by the present disclosure to solve the technical problem is as follows:

A lighting device with low mispress buttons, which includes a tail cover, a first button and a second button, and further includes:

a pressing plate rotatably connected to the tail cover and covering the second button to trigger and release the second button; the pressing plate is lower than the first button;

the pressing plate includes a first inclined surface and a second inclined surface; the first inclined surface is arranged between the second inclined surface and the first button, and is connected to the second inclined surface; the second inclined surface is inclined downward relative to the first inclined surface; an end of the first inclined surface close to the second inclined surface is lower than an end of the first inclined surface close to the first button.

In the lighting device with low mispress buttons, an angle between the first inclined surface and the second inclined surface is an obtuse angle.

In the lighting device with low mispress buttons, a groove recessed downwardly is arranged on the tail cover, the first button is arranged outside the groove, and the second button is arranged on a bottom of the groove.

The lighting device with low mispress buttons further includes:

two first enclosures arranged on the tail cover and located on both sides of the groove; and the second button is arranged between the two first enclosures.

The lighting device with low mispress buttons further includes:

two second enclosures arranged on the tail cover and located outside the groove; the first button is arranged between the two second enclosures; and an arranging direction of the two second enclosures is parallel to an arranging direction of the two first enclosures.

In the lighting device with low mispress buttons, an anti-slip portion is arranged on the first inclined surface and/or the second inclined surface.

The lighting device with low mispress buttons further includes:

a mounting portion arranged on the tail cover; the mounting portion is arranged between the first button and the second button, and is detachably rotatably connected to the pressing plate;

when the second button is in a released state, a lower surface of the mounting portion contacts the second button.

In the lighting device with low mispress buttons, an upper surface of the mounting portion is inclined and is arranged on a same plane as the first inclined surface.

In the lighting device with low mispress buttons, a receiving groove is arranged on the mounting portion, the receiving groove is recessed from bottom to top; a portion of the first button is arranged in the receiving groove, and when the first button is in a released state, the first button is in contact with a top wall of the receiving groove.

In the lighting device with low mispress buttons, an inclination angle of the first inclined plane relative to a horizontal plane is 5° to 30°; an inclination angle of the second inclined plane relative to the horizontal plane is 30° to 70°.

Beneficial effect: In the present disclosure, when the user uses the thumb to trigger the first button, the surface formed by the connection of the first inclined surface and the second inclined surface effectively avoids the thumb from moving downward, and the probability of accidentally touching the pressing plate is reduced by the inclination of the first inclined surface and the second inclined surface, thereby reducing the probability of mispressing the second button when the first button is triggered.

DETAILED DESCRIPTION OF EMBODIMENTS

In order to make the purpose, technical solution and advantages of the present disclosure clearer and more specific, the present disclosure is further described in detail below with reference to the accompanying drawings and embodiments. It should be understood that the embodiments described herein are only used to explain the present disclosure and are not used to limit the present disclosure.

Figure 1:
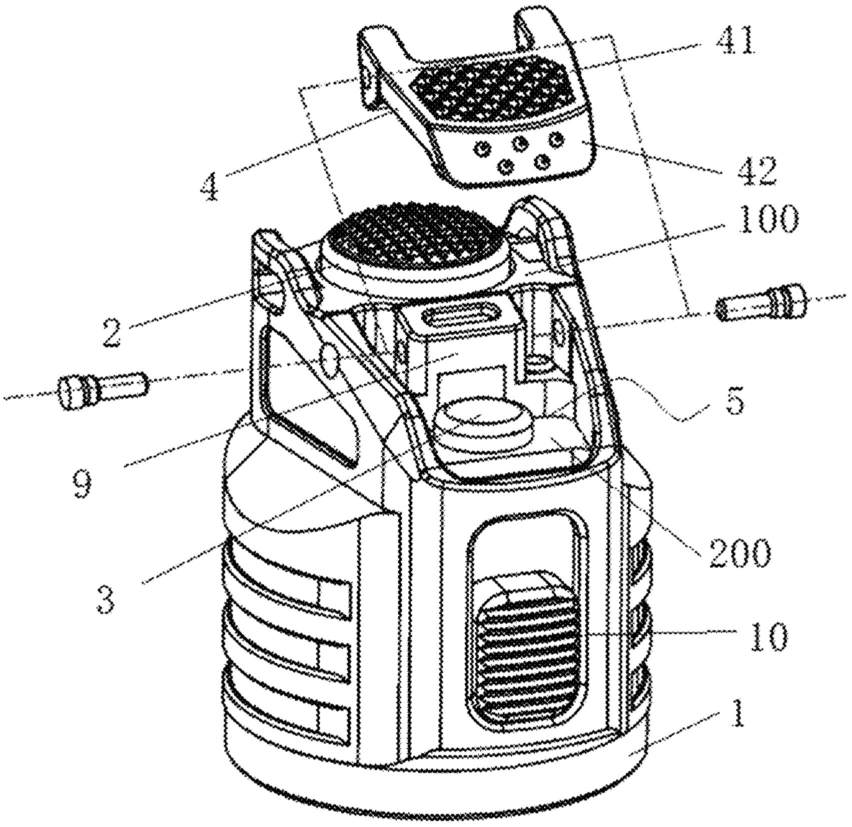
FIG. 1 is a schematic diagram of an exploded structure of the pressing plate and the tail cover in the present disclosure.
Figure 2:
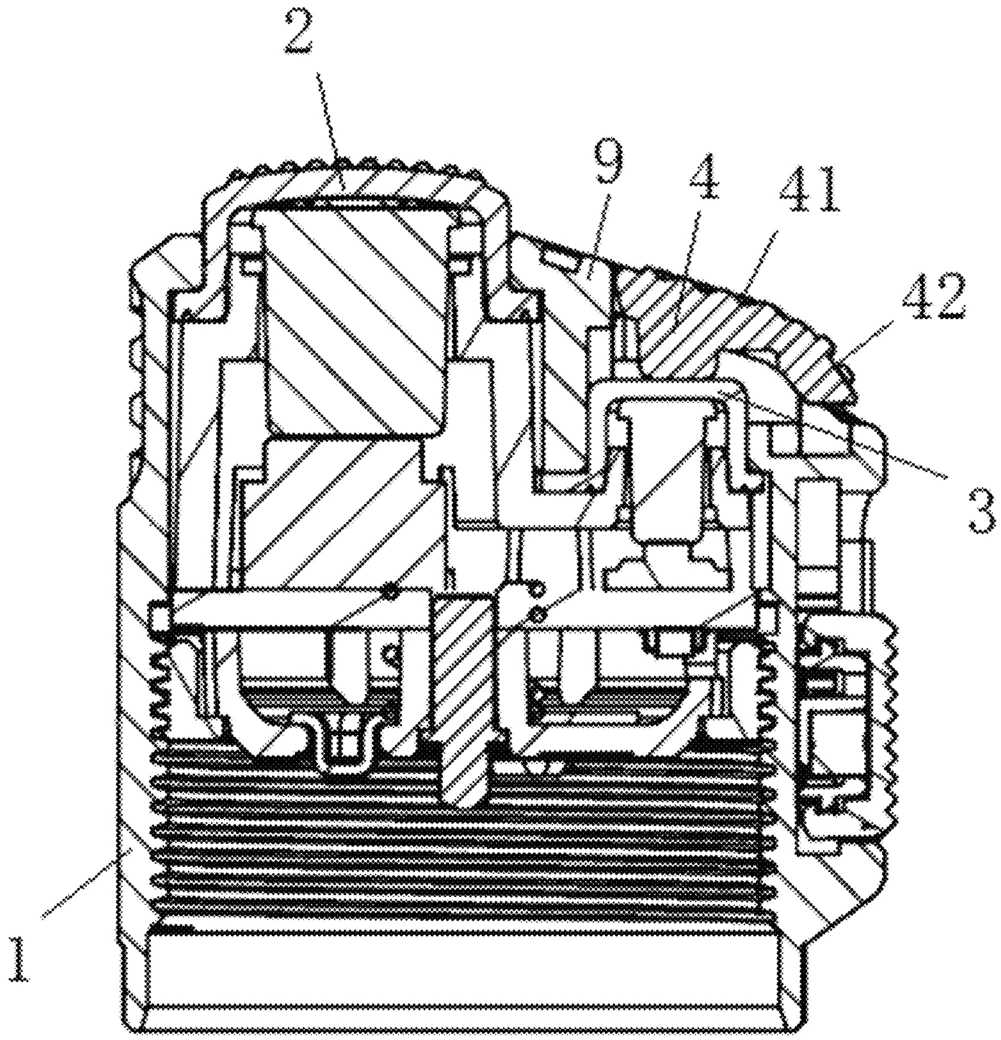
FIG. 2 is an overall cross-sectional view of an assembly of the pressing plate and the tail cover in the present disclosure.

The present disclosure provides a lighting device with low mispress buttons, as shown in FIG. 1 and FIG. 2, the lighting device with low mispress buttons includes a tail cover 1, a first button 2, a second button 3 and a pressing plate 4. The first button 2 and the second button 3 are both arranged on the tail cover 1, and able to be moved up and down to be triggered and released. The pressing plate 4 is rotatably connected to the tail cover 1 and covers a top of the second button 3. The second button 3 is located on a rotation path of the pressing plate 4, then in a natural state, the pressing plate 4 does not provide pressure on the second button 3, and the second button 3 is in a released state. When the user's finger presses the pressing plate 4 downward, the pressing plate 4 rotates relative to the tail cover 1 and presses down the second button 3, so as to trigger the second button 3. When the user's finger releases the pressing plate 4, the second button 3 is reset and supports the pressing plate 4 to reset position, and the second button 3 returns to the released state.

It can be understood that the first button 2 can be a main button, and the second button 3 can be a sub-button; or the first button 2 can be the sub-button, and the second button 3 can be the main button. The functions of the first button 2 and the second button 3 are not limited in the present disclosure, such as the first button 2 may be configured to control the on and off of the power supply, and the second button 3 is configured to dimming (adjusting the lighting mode and level); or the first button 2 is configured to dimming, and the second button 3 is configured to control the on and off of the power supply. The pressing plate 4 is used to increase the contact area between the second button 3 and the user's finger, thereby improving the convenience of pressing and triggering the second button 3. The pressing plate 4 can be a metal pressing plate 4, a plastic pressing plate 4, or a rubber pressing plate 4.

As shown in FIGS. 1 to 4, the pressing plate 4 includes a first inclined surface 41 and a second inclined surface 42. The first inclined surface 41 is located between the second inclined surface 42 and the first button 2, and is connected to the second inclined surface 42. The second inclined surface 42 is inclined downward relative to the first inclined surface 41. One end of the first inclined surface 41 close to the second inclined surface 42 is lower than another one end close to the first button 2, and one end of the second inclined surface 42 away from the first inclined surface 41 is lower than another one end close to the first inclined surface 41.

Figure 5:
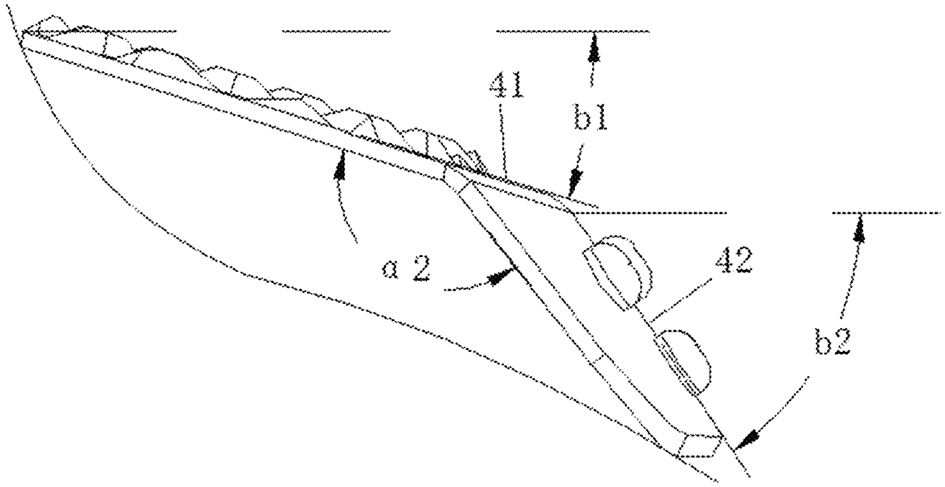
FIG. 5 is a schematic diagram of a structure of the pressing plate in the present disclosure.
Figure 6:
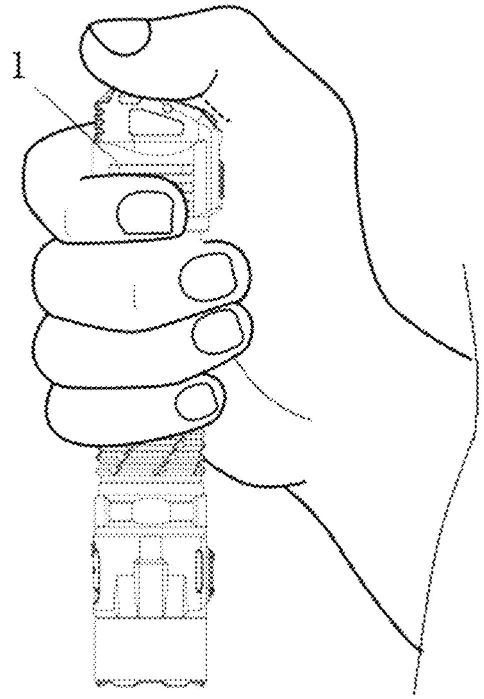
FIG. 6 is a reference diagram of a usage state when the user holds the lighting device with low mispress buttons to trigger the first button in the present disclosure.
Figure 7:
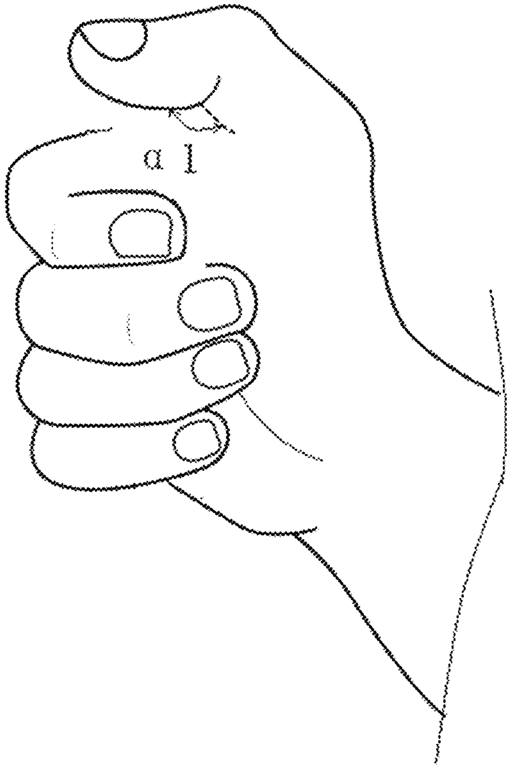
FIG. 7 is a schematic diagram of a state of the user's hand when the user holds the lighting device with low mispress buttons to trigger the first button in the present disclosure.

When the user uses the lighting device with low mispress buttons, the user usually arranges the lighting device with low mispress buttons vertically, with the tail cover 1 facing upward, and then uses the thumb to trigger the first button 2 or the second button 3. While the user's remaining four fingers hold the barrel body of the lighting device with low mispress buttons, and the thumb presses the first button 2 (as shown in FIG. 6 and FIG. 7), the fingertip of the thumb is parallel to a surface of the first button 2, and a first angle $\alpha 1$ is formed at a first joint of the thumb (as shown in FIG. 7). Meanwhile, a second angle $\alpha 2$ formed by the first inclined surface 41 and the second inclined surface 42 (as shown in FIG. 5) does not match the first angle $\alpha 1$, so that when the user uses the thumb to trigger the first button 2, a surface of the pressing plate 4 (the surface formed by the connection of the first inclined surface 41 and the second inclined surface 42) effectively avoids the thumb moving downward, and the probability of accidentally mispressing the pressing plate 4 is reduced by the inclination of the first inclined surface 41 and the second inclined surface 42, thereby reducing the probability of accidentally mispressing the second button 3 when the first button 2 is triggered.

At the same time, since the surface of the pressing plate 4 is formed by connecting the first inclined surface 41 and the second inclined surface 42, compared with the pressing plate 4 having a flat surface, the surface of the pressing plate 4 in the present disclosure increases the contact area with the user's thumb, so that the contact area of the limited area on the surface of the pressing plate 4 is maximized.

It should be noted that, when the second button 3 is in the released state, the pressing plate 4 is lower than the first button 2, that is, when the second button 3 is in the released state, the surface of the pressing plate 4 is in the rearmost position, and the end of the first inclined surface 41 close to the first button 2 is lower than the first button 2, and the end of the first inclined surface 41 close to the second inclined surface 42 is lower than the end close to the first button 2, so that the whole surface of the pressing plate 4 is lower than the first button 2, thereby reducing or even eliminating the contact between the user's thumb and the pressing plate 4 when pressing the first button 2.

In one embodiment of the present disclosure, the second angle $\alpha 2$ is an obtuse angle, so that after the user adjusts the state of the first button 2, the user can lifts the thumb without moving the proximal phalanx of the thumb, and apply pressure to the second inclined surface 42 through the distal phalanx, thereby triggering the second button 3.

In one embodiment of the present disclosure, as shown in FIG. 1, the tail cover 1 is provided with a downwardly recessed groove 5, the first button 2 is located outside the groove 5, and the second button 3 is provided at a bottom of the groove 5.

Specifically, a height difference exists between the plane where the first button 2 is located on the tail cover 1 and the plane where the second button 3 is located on the tail cover 1, and as shown in FIG. 1, the plane 200 where the second button 3 is located on the tail cover 1 is lower than the plane 100 where the first button 2 is located on the tail cover 1. The groove 5 is used to accommodate the second button 3 and provide a height difference between the first button 2 and the second button 3. At the same time, the groove 5 can also be used to accommodate fingers, when the pressing plate 4 is not used to trigger the second button 3, the user's thumb can be placed in the groove 5 to trigger the second button 3. In this way, under the action of the groove 5, not only mispressing the second button 3 is effectively avoided when the first button 2 is pressed, but also mispressing the first button 2 is effectively avoided when the second button 3 is pressed.

Figure 3:
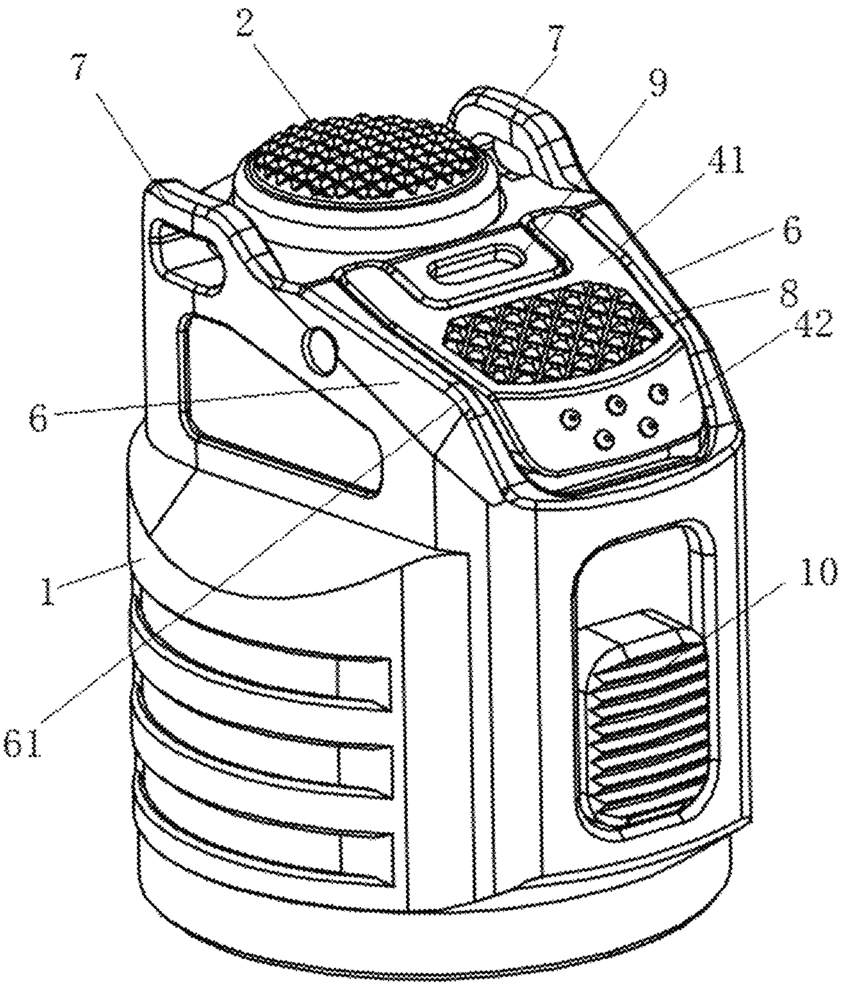
FIG. 3 is a perspective view of the assembly of the pressing plate and the tail cover in the present disclosure.
Figure 4:
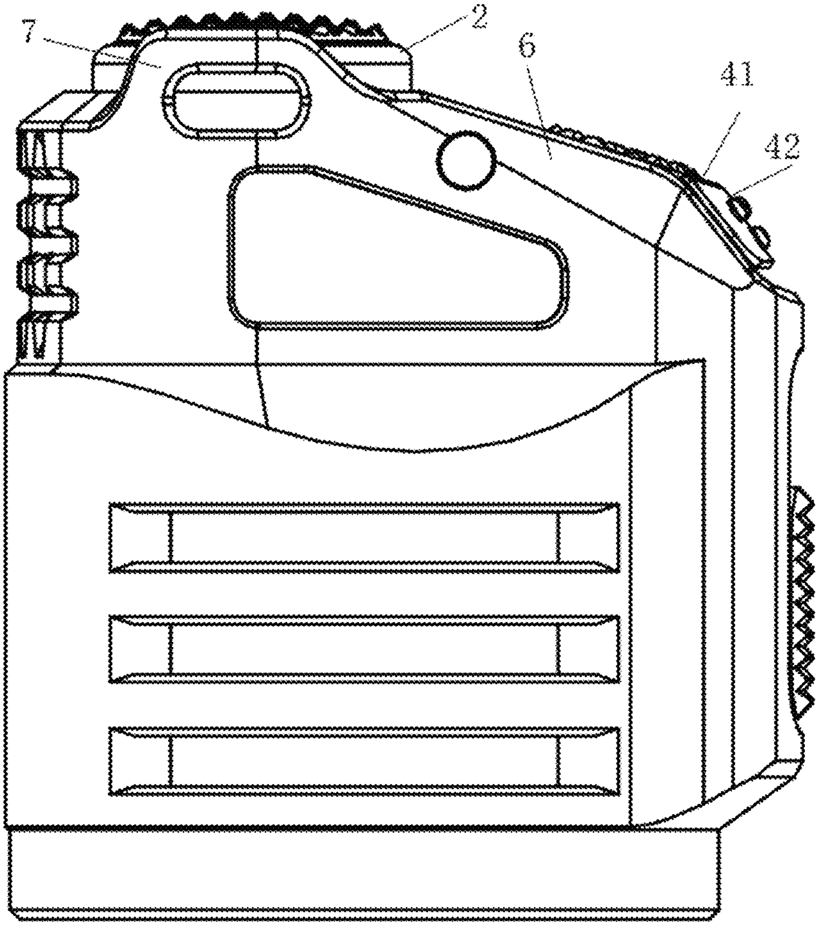
FIG. 4 is a side view of the assembly of the pressing plate and the tail cover in the present disclosure.

In an embodiment of the present disclosure, as shown in FIG. 3 and FIG. 4, the lighting device with low mispress buttons also includes two first enclosures 6. The two first enclosures 6 are arranged on the tail cover 1 and are located on both sides of the groove 5. The second button 3 is located between the two first enclosures 6.

Specifically, the pressing plate 4 and the second button 3 are both located between the two first enclosures 6. An arranging direction of the two first enclosures 6 is perpendicular to an arranging direction of the first button 2 and the second button 3. The two first enclosures 6 shield the second button 3 from both sides of the groove 5, thereby preventing the user from accidentally mispressing the pressing plate 4 from other directions.

In one embodiment of the present disclosure, as shown in FIG. 3 and FIG. 4, the lighting device with low mispress buttons further includes two second enclosures 7. The two second enclosures 7 are arranged on the tail cover 1 and outside the groove 5, the first button 2 is located between the two second enclosures 7, an arranging direction of the two second enclosures 7 is parallel to the arranging direction of the two first enclosures 6. The two second enclosures 7 shield the first button 2 from both sides of the first button 2, thereby preventing the user from accidentally mispressing the first button 2 from other directions.

The first enclosure 6 is lower than the second enclosure 7, so that the second enclosure 7 is more suitable for pressing the first button 2, and the first enclosure 6 is more suitable for pressing the second button 3, thereby preventing the first enclosure 6 from causing adverse interference to the thumb when the user switches from pressing the first button 2 to pressing the second button 3, thereby improving the convenience of the user to switch between pressing the first button 2 and the second button 3.

The surface 61 of the first enclosure 6 is a curved surface (as shown in FIG. 3), and the curved surface is adapted to the inclined transition between the first inclined surface 41 and the second inclined surface 42, which makes it easy to judge the position of the pressing plate 4 by touching the curved surface even in a dark environment, and can also improve the overall coordination of the appearance of the tail cover 1 when viewed from the side.

In one embodiment of the present disclosure, as shown in FIG. 3, an anti-slip portion 8 is provided on the first inclined surface 41 and/or the second inclined surface 42, so that the friction between the pressing plate 4 and the user's thumb is increased by the anti-slip portion 8, thereby achieving the purpose of improving the turning on efficiency of the second button 3.

In one embodiment of the present disclosure, as shown in FIG. 2 and FIG. 3, the lighting device with low mispress buttons also includes a mounting portion 9, which is disposed on the tail cover 1. The mounting portion 9 is located between the first button 2 and the second button 3, and is detachably rotatably connected to the pressing plate 4.

Figure 8:
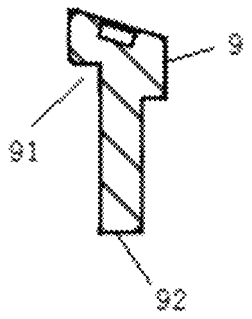
FIG. 8 is a schematic diagram of a structure of the mounting portion in the present disclosure.

When the second button 3 is in the released state, a lower surface 92 of the mounting portion 9 (as shown in FIG. 8) contacts the second button 3, that is, when the second button 3 is in the highest position, the lower surface 92 of the mounting portion 9 limits the second button 3. Specifically, a receiving groove is provided on the pressing plate 4, a part of the mounting portion 9 is located in the receiving groove, and the pressing plate 4 is rotatably connected to the mounting portion 9 and the first enclosure 6, respectively, through a pin shaft. The mounting portion 9 can isolate the first button 2 and the second button 3, and limits the first button 2 and the second button 3 at the same time. When the user's thumb presses the first button 2, the contact between the user's thumb and the pressing plate 4 can be effectively reduced due to the isolation effect of the mounting portion 9.

In one implementation of the present embodiment, an upper surface of the mounting portion 9 is inclined and is located on the same plane as the first inclined surface 41, so that the upper surface of the mounting portion 9 forms an extension of the first inclined surface 41 in the direction close to the first button 2. When the user's thumb presses the first button 2, the upper surface of the mounting portion 9 can also produce a certain avoidance effect for the user's thumb, further decreasing the probability of the second button 3 being pressed by mistake.

In one implementation of the present embodiment, as shown in FIG. 8, the receiving groove 91 is provided on the mounting portion 9, and the receiving groove 91 is arranged to be recessed from bottom to top. A portion of the first button 2 is located in the receiving groove 91, and when the first button 2 is in a released state (that is, when the first button 2 is in the highest position), the first button 2 contacts a top wall of the receiving groove 91. The receiving groove 91 increases the contact area between the first button 2 and the mounting portion 9, and the top wall of the receiving groove 91 can be used to limit the first button 2.

In one embodiment of the present disclosure, an inclination angle b1 of the first inclined surface 41 relative to a horizontal plane is 5°~30°, and an inclination angle b2 of the second inclined surface 42 relative to the horizontal plane is 30°~70°, so that the inclination degree of the surface of the pressing plate 4 that contacts the user's thumb is more ergonomically designed and more conducive to the user's thumb pressing.

In one embodiment of the present disclosure, as shown in FIG. 1 and FIG. 3, a toggle button 10 (such as a quick-off toggle button) is also provided on one side of the tail cover 1. The groove 5 and the two first enclosures 6 form an accommodating space, and the mounting portion 9 and the second button 3 are both located in the accommodating space. In order to maintain the visual consistency of the toggle button 10 and the accommodating space, the width of the accommodating space close to the toggle button 10 is smaller than the width of the accommodating space close to the first button 2.

It should be understood that the present disclosure is not limited to the above embodiments. For those skilled in the art, improvements or modifications can be made based on the above description. All these improvements and modifications should fall within the scope of protection of the claims attached to the present disclosure.

What is claimed is:

1. A lighting device with low mispress buttons, the lighting device comprising: a tail cover, a first button and a second button, and a pressing plate rotatably connected to the tail cover and covering the second button to trigger and release the second button, wherein the pressing plate is lower than the first button;

and the pressing plate comprises a first inclined surface and a second inclined surface; the first inclined surface is arranged between the second inclined surface and the first button, and is connected to the second inclined surface; the second inclined surface is inclined downward relative to the first inclined surface; and an end of the first inclined surface close to the second inclined surface is lower than an end of the first inclined surface close to the first button.

2. The lighting device with low mispress buttons according to claim 1, wherein an angle between the first inclined surface and the second inclined surface is an obtuse angle.

3. The lighting device with low mispress buttons according to claim 1, wherein a groove recessed downwardly is arranged on the tail cover, the first button is arranged outside the groove, and the second button is arranged on a bottom of the groove.

4. The lighting device with low mispress buttons according to claim 3, further comprising:

two first enclosures, arranged on the tail cover and located on both sides of the groove; and the second button is arranged between the two first enclosures.

5. The lighting device with low mispress buttons according to claim 4, further comprising:

two second enclosures arranged on the tail cover and located outside the groove; the first button is arranged between the two second enclosures; and an arranging direction of the two second enclosures is parallel to an arranging direction of the two first enclosures.

6. The lighting device with low mispress buttons according to claim 1, wherein an anti-slip portion is arranged on the first inclined surface and/or the second inclined surface.

7. The lighting device with low mispress buttons according to claim 1, further comprising:

a mounting portion, arranged on the tail cover; the mounting portion is arranged between the first button and the second button, and is detachably rotatably connected to the pressing plate; and when the second button is in a released state, a lower surface of the mounting portion contacts the second button.

8. The lighting device with low mispress buttons according to claim 7, wherein an upper surface of the mounting portion is inclined and is arranged on a same plane as the first inclined surface.

9. The lighting device with low mispress buttons according to claim 7, wherein a receiving groove is arranged on the mounting portion, the receiving groove is recessed from bottom to top; a portion of the first button is arranged in the receiving groove, and, when the first button is in a released state, the first button is in contact with a top wall of the receiving groove.

10. The lighting device with low mispress buttons according to claim 1, wherein an inclination angle of the first inclined plane relative to a horizontal plane is 5° to 30°; an inclination angle of the second inclined plane relative to the horizontal plane is 30° to 70°.

* * * * *